United States Patent
Tang et al.

(10) Patent No.: US 10,488,100 B2
(45) Date of Patent: Nov. 26, 2019

(54) SUPPLEMENTAL COOLING SYSTEM LOAD CONTROL USING RANDOM START OF FIRST DEFROST CYCLE

(71) Applicant: HONEYWELL INTERNATIONAL INC., Morris Plains, NJ (US)

(72) Inventors: Benjamin Tang, Monterey Park, CA (US); Randy Brunter, Los Alamitos, CA (US); Peter Zheng, Rancho Palos Verdes, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 474 days.

(21) Appl. No.: 15/347,731

(22) Filed: Nov. 9, 2016

(65) Prior Publication Data

US 2018/0128535 A1    May 10, 2018

(51) Int. Cl.
| | |
|---|---|
| *F25D 21/06* | (2006.01) |
| *B64D 11/00* | (2006.01) |
| *F25D 21/00* | (2006.01) |
| *F25D 31/00* | (2006.01) |
| *B64D 11/04* | (2006.01) |

(52) U.S. Cl.
CPC .......... *F25D 21/06* (2013.01); *B64D 11/0007* (2013.01); *B64D 11/04* (2013.01); *F25D 21/006* (2013.01); *F25D 21/008* (2013.01); *F25D 31/006* (2013.01); *F25D 2331/806* (2013.01)

(58) Field of Classification Search
CPC .......... F25D 21/06; F25D 21/02; F25D 15/00; F25D 13/00; F25D 31/006; F25D 21/006; F25D 23/006; F25D 17/00; F25D 21/008; F25D 2331/806; F25B 47/02; F25B 5/02; B64D 11/04; B64D 11/0007
See application file for complete search history.

(56) References Cited

U.S. PATENT DOCUMENTS

| | | | |
|---|---|---|---|
| 4,884,414 A | 12/1989 | Bos | |
| 5,673,565 A | 10/1997 | Jeong et al. | |
| 5,921,092 A * | 7/1999 | Behr | A47F 3/0482 62/155 |
| 6,845,627 B1 | 1/2005 | Buck | |
| 9,188,380 B2 | 11/2015 | Lu et al. | |
| 2008/0104982 A1 | 5/2008 | Sunderland | |
| 2008/0156028 A1* | 7/2008 | Cur | F25B 25/00 62/203 |

(Continued)

OTHER PUBLICATIONS

Extended Search Report from EP application No. 17199610.1 dated Feb. 23, 2018.

*Primary Examiner* — Emmanuel E Duke
(74) *Attorney, Agent, or Firm* — Shimokaji IP

(57) ABSTRACT

Methods, apparatus, and systems for load control for cooling systems are provided. Coolant flows through a plurality of cooling units in a cooling system. The coolant flow is halted for each cooling unit that is undergoing a defrost cycle. Each cooling unit is configured to start a first defrost cycle at a random time within a predetermined time range after the cooling unit is started or powered on. After the first random start defrost cycle, a regular periodic defrost cycle may be maintained. Thus, the cooling units may be powered on simultaneously while still providing desynchronized defrost cycles, enabling the cooling system to maintain adequate coolant flow and heat load to avoid deleterious stop and restart cycles.

20 Claims, 3 Drawing Sheets

(56) References Cited

U.S. PATENT DOCUMENTS

| | | | |
|---|---|---|---|
| 2012/0137712 A1* | 6/2012 | Truemper | B64D 13/00 62/115 |
| 2015/0065024 A1* | 3/2015 | Moran | B64D 11/0007 454/74 |
| 2015/0266353 A1* | 9/2015 | Lu | B64D 11/04 62/89 |

* cited by examiner

SUPPLEMENTAL COOLING SYSTEM LOAD CONTROL USING RANDOM START OF FIRST DEFROST CYCLE

BACKGROUND OF THE INVENTION

The present invention generally relates to cooling systems. More particularly, the present invention relates to apparatus, systems and methods for providing cooling system load control using a random start of a first defrost cycle.

For certain applications, a centralized refrigeration system may be suitable to service multiple locations requiring temperature regulation. One such application is galley cooling on a large commercial aircraft. In this application, a vapor cycle system comprising of a compressor, condenser, expansion valve, evaporator, and refrigerant is often utilized to chill liquid coolant, which is cooled through a centralized evaporator for distribution to various cooling units in the galleys of the aircraft. This coolant may flow through heat exchangers in the cooling units. By using a fan or air convection, the heat exchanger may absorb heat inside the cooling units, thereby reducing the inside ambient temperature to a desired food safe temperature. The coolant then returns to the vapor cycle system evaporator to be cooled again.

To keep food stored in the galleys at a safe temperature, all of the cooling units may need to be started or powered on at the same time. Further, due to the configuration of the electrical wiring in the aircraft, simultaneous power on of the cooling units may be an operational requirement. However, if there is no coordination between the cooling units, then all of the cooling units may enter a periodic defrost cycle at approximately the same time. During the defrost cycle, the cooling units may engage a valve to stop the flow of coolant through the heat exchangers. When all of the cooling units simultaneously stop the flow of coolant, the lack of coolant flow and heat load causes a rapid drop in the evaporating pressure of the vapor cycle system, which in turn causes a rapid increase in compressor pressure ratio and compressor outlet temperature.

To prevent overheating of the compressor, the vapor cycle system may require shutdown during the defrost cycle and startup after the defrost cycle ends. This repeated startup and shutdown cycle causes thermal stress and mechanical stress (wear and tear) on system equipment that can cause premature failure. Moreover, orchestrating this startup and shutdown cycle is a delicate and challenging process when conducted in the extremely hot or cold environment of an aircraft on ground or in flight.

Some form of cooling system load control is therefore needed to desynchronize the defrost cycles, thereby maintaining a baseline coolant flow and avoiding wear and tear from unnecessary start and stop cycles. One prior approach staggers the startup of the cooling units to prevent defrost cycles from starting at the same time. However, this approach is undesirable in the context of food storage, as food may be kept at unsafe temperatures when cooling units are not powered on right away.

Furthermore, the prior approach may require modifying the software logic and wiring in the refrigeration system. This software modification may not be feasible, particularly when using an existing turnkey solution. The additional system software complexity may also make integration, maintenance and repair more difficult, which is particularly troublesome in a commercial aircraft where every minute of downtime counts.

As can be seen, there is a need for apparatus, systems and methods for cooling system load control that are robust in challenging operational environments while still providing ease of integration and simplified management.

SUMMARY OF THE INVENTION

In one aspect of the present invention, a method for providing load control for a plurality of cooling units comprises, for each of the plurality of cooling units: allowing a flow of coolant through said each of the plurality of cooling units, wherein the flow of coolant is shared with the plurality of cooling units; determining a first defrost cycle, wherein a start time of the first defrost cycle is selected randomly within a predetermined time range; determining periodic defrost cycles, wherein a start time of each of the periodic defrost cycles is selected periodically after the first defrost cycle; and denying the flow of coolant through said each of the plurality of cooling units during the first defrost cycle and the periodic defrost cycles.

In another aspect of the present invention, a load controlled cooling system comprises a plurality of cooling units; and a centralized refrigeration system providing a flow of coolant shared with the plurality of cooling units; wherein each of the plurality of cooling units is configured to: allow the flow of coolant through said each of the plurality of cooling units; determine a first defrost cycle, wherein a start time of the first defrost cycle is selected randomly within a predetermined time range; determine periodic defrost cycles, wherein a start time of each of the periodic defrost cycles is selected periodically after the first defrost cycle; and deny the flow of coolant through said each of the plurality of cooling units during the first defrost cycle and the periodic defrost cycles.

In a further aspect of the present invention, a first cooling unit comprises a heat exchanger and a processor, wherein the processor is configured to: allow a flow of coolant through the heat exchanger; determine a first defrost cycle, wherein a start time of the first defrost cycle is selected randomly within a predetermined time range; determine periodic defrost cycles, wherein a start time of each of the periodic defrost cycles is selected periodically after the first defrost cycle; and deny the flow of coolant through the heat exchanger during the first defrost cycle and the periodic defrost cycles.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, this invention relates to providing load control for cooling systems. In this invention, each cooling unit in a cooling system may be configured to start a first defrost cycle at a random time within a predetermined time range after the cooling unit is started or powered on. After the first random start defrost cycle, a regular periodic defrost cycle may be maintained. In this manner, all of the cooling units can be turned on at the same time while providing desynchronized defrost cycles. Thus, a baseline level of coolant flow can be established throughout the cooling system to prevent unnecessary stop and restart cycles, ensuring smooth and robust operation of the cooling system to support challenging operational environments such as aircraft in flight.

Advantageously, each cooling unit can independently determine its own first random start defrost cycle. Accordingly, no communication or coordination is required between the cooling units of the cooling system, reducing management complexity and simplifying deployment. Additionally, because the defrost logic may be contained within the cooling unit, the cooling system does not require any software modifications, enabling easy integration into existing cooling systems. Further, repairs and maintenance can be easily carried out as cooling units can be removed, added, or replaced without having to change any system-wide settings or configurations.

Figure 1:
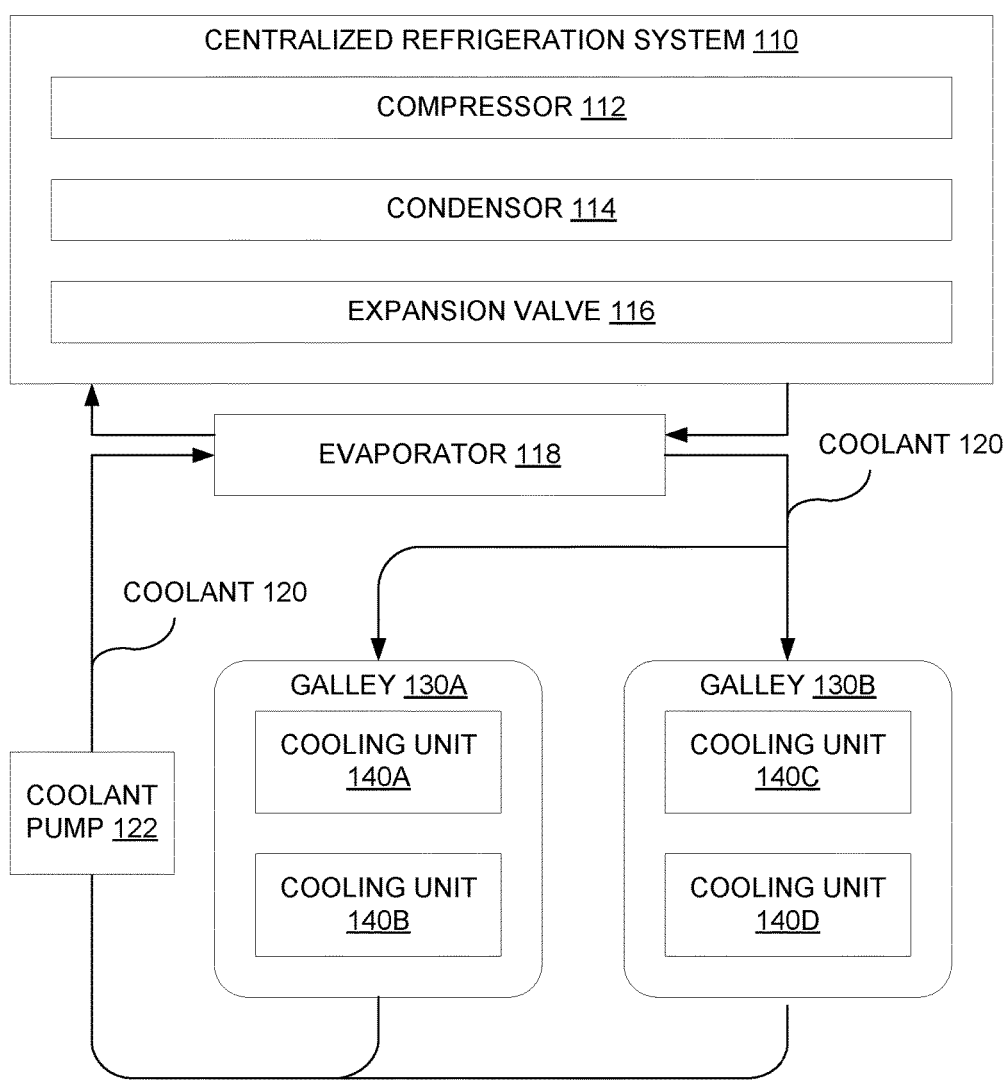
FIG. 1 is a schematic diagram of an exemplary load controlled cooling system for a plurality of cooling units, according to an embodiment of the present invention.

FIG. 1 is a schematic diagram of an exemplary load controlled cooling system for a plurality of cooling units, according to an embodiment of the present invention. Cooling system 100 of FIG. 1 may include centralized refrigeration system 110, evaporator 118, coolant 120, coolant pump 122, galley 130A and galley 130B. Centralized refrigeration system 110 may include compressor 112, condenser 114, and expansion valve 116. Galley 130A may include cooling unit 140A and cooling unit 140B. Galley 130B may include cooling unit 140C and cooling unit 140D.

While the example shown in FIG. 1 is specifically in the context of aircraft galleys, cooling system 100 can be adapted to any cooling application requiring load control for multiple cooling units. Further, while FIG. 1 shows two galleys 130A-130B, four cooling units 140A-140D, and a single centralized refrigeration system 110, other embodiments may use any number of cooling units distributed to any number of locations, and coolant 120 may be provided by one or more refrigeration systems. Further, FIG. 1 demonstrates an example with a centralized evaporator 118; in alternative embodiments, each cooling unit may contain its own evaporator, or a multi-tier system of compressors and evaporators may be utilized.

As shown in FIG. 1, centralized refrigeration system 110 may include conventional components used in a vapor cycle system, as known in the art. Thus, a refrigerant, such as Freon, may be processed through compressor 112, condenser 114, expansion valve 116, and evaporator 118 to provide a chilled liquid or semi-liquid coolant, or coolant 120. Coolant 120 may comprise, for example, a glycol/water solution. As shown in FIG. 1, coolant 120 can be cooled through evaporator 118 to be distributed to different areas in cooling system 100, or galley 130A and galley 130B. Coolant 120 may then be routed through each of the cooling units 140A-140D as necessary to maintain an appropriate temperature that is safe for storing food. Coolant 120 may then be pumped by coolant pump 122 to return back to evaporator 118 to be cooled again.

As discussed above in the background, a problem arises when all of the cooling units are powered on at the same time. In a conventional cooling unit, each cooling unit may enter a defrost cycle at periodic time intervals, which may be the same for each cooling unit. If this is the case, then each of cooling units may enter the defrost cycle at the same time. Since each of the cooling units will bypass coolant during the defrost cycle, a sudden drop in heat load occurs which places an extreme strain on compressor, leading to overheating if the centralized refrigeration system is not shut down. Once the defrost cycles are over, the centralized refrigeration system will need to be restarted. In the present invention, these start and stop cycles may be completely avoided to prevent unnecessary strain and wear on the components of cooling system 100.

Figure 2:
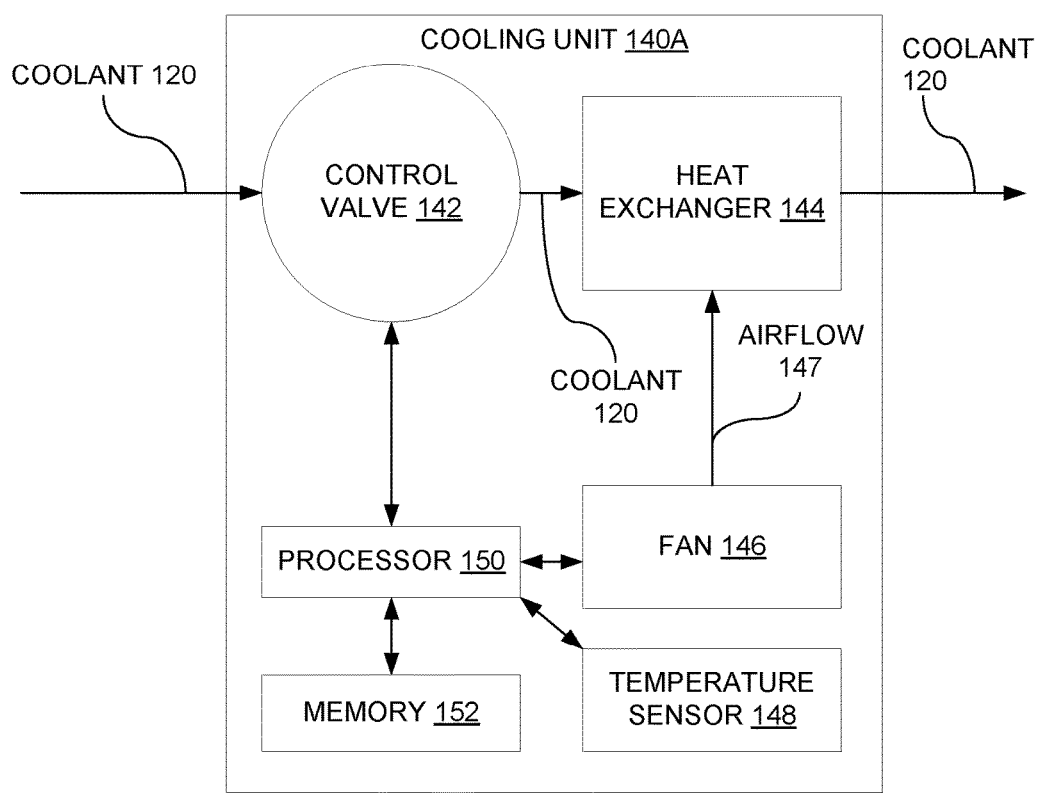
FIG. 2 is a schematic diagram of an exemplary cooling unit, according to an embodiment of the present invention.

With a broad overview of cooling system 100 now established, turning to FIG. 2, FIG. 2 is a schematic diagram of an exemplary cooling unit, according to an embodiment of the present invention. Cooling unit 140A includes control valve 142, heat exchanger 144, fan 146, airflow 147, temperature sensor 148, processor 150, and memory 152. Coolant 120 flows into control valve 142. With respect to FIG. 2, like numbered elements may correspond to the same elements from FIG. 1. While FIG. 2 only depicts the components of cooling unit 140A, it should be understood that other cooling units of cooling system 100, including cooling unit 140B, 140C, and 140D, may also include similar components as cooling unit 140A. Additionally, each cooling unit may also include an evaporator if a centralized evaporator is not utilized.

Control valve 142 may comprise one or more valves to control the flow of coolant 120 with respect to cooling unit 140A. While control valve 142 is shown as the flow control device, other routing elements may also be utilized. As shown in FIG. 2, coolant 120 may either bypass cooling unit 140A entirely or route through heat exchanger 144 before exiting cooling unit 140A. Heat exchanger 144 may comprise a pipe in a coiled configuration, plate fin, tube to shell, or other heat exchanger types. Airflow 147 is directed towards heat exchanger 144 such that coolant 120 absorbs heat from the ambient air within cooling unit 140A. Airflow 147 may be generated by fan 146 or by using convection or other techniques. Temperature sensor 148 may detect a temperature of the ambient air within cooling unit 140A. Processor 150 and memory 152 may correspond to a conventional computer executing instructions written on a non-transitory storage media. Processor 150 can adjust control valve 142 and fan 146 and read temperature sensor 148 and memory 152.

Figure 3:
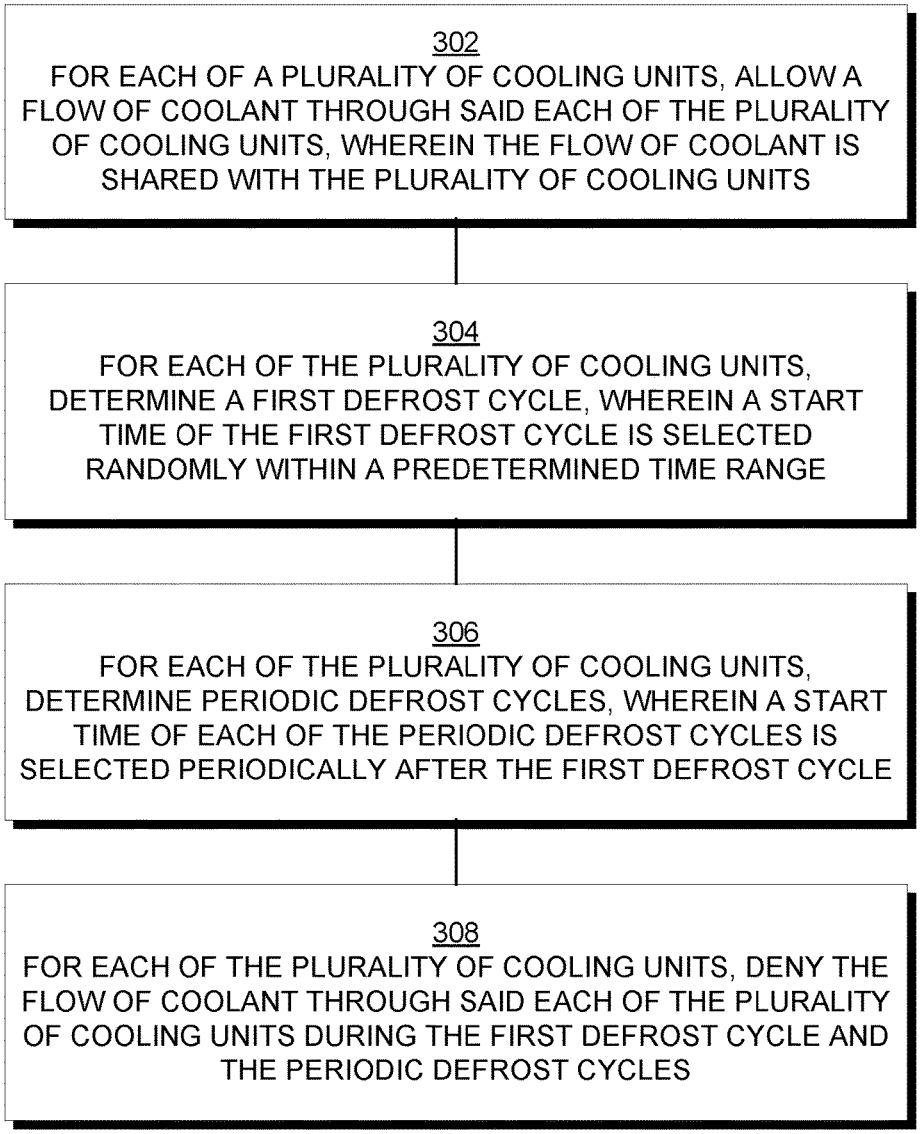
FIG. 3 is a flowchart of an exemplary method for providing load control for a plurality of cooling units, according to an embodiment of the present invention.

Now that the details of an exemplary cooling unit have been described, turning to FIG. 3, FIG. 3 is a flowchart of an exemplary method for providing load control for a plurality of cooling units, according to an embodiment of the present invention. Process 300 includes block 302, block 304, block 306, and block 308.

With reference to FIG. 1, at block 302, for each of cooling units 140A-140D, a flow of coolant 120 is allowed through each of cooling units 140A-140D, wherein the flow of coolant 120 is shared with cooling units 140A-140D. Thus, with reference to FIG. 2, each of cooling units 140A-140D may direct a respective control valve 142 to direct a flow of coolant 120 through heat exchanger 144. Each of cooling units 140A-140D may therefore be powered on substantially concurrently, and processor 150 may, in response to the powering on, execute instructions as part of a startup boot sequence that directs control valve 142 to flow coolant 120 through heat exchanger 144. Advantageously, this allows all of cooling units 140A-140D to come online immediately, which is of particular importance for food storage applications.

With reference to FIG. 1, at block 304, for each of cooling units 140A-140D, a first defrost cycle is determined, wherein a start time of the first defrost cycle is selected randomly within a predetermined time range. The predetermined time range may be based on an interval defined by a periodic defrost cycle used by each of the cooling units 140A-140D. The predetermined time range may also be based on a length defined by the periodic defrost cycles.

For example, assume that memory 152 of each of cooling units 140A-140D defines the periodic defrost cycle as occurring periodically every 20 minutes and having a length of 5 minutes. If this is the case, then the predetermined time range may be set to a time window that is based on this interval of 20 minutes. For example, the predetermined time range may be set to a time window centered at 20 minutes after powering on. Since a length of the periodic defrost cycle is 5 minutes, the time window may be set to not exceed this length from the center of the time window. In other words, the time window may be set to be within 20±5 minutes after powering on, or between 15 to 25 minutes. Of course, this is merely an example, and any suitable method may be used to determine the predetermined time range.

Once the predetermined time range is known, then processor 150 selects a start time of the first defrost cycle randomly within that predetermined time range. Thus, continuing with the example above, processor 150 may select any start time randomly selected between 15 to 25 minutes. Processor 150 may utilize any suitable random or pseudo-random number generator to ensure a sufficiently random distribution of first defrost cycle start times for each of cooling units 140A-140D. With a sufficiently advanced random number generator algorithm and a large enough predetermined time range, the chance of start time collisions may be significantly reduced to ensure a relatively even distribution of start times within the predetermined time range.

Note that each cooling unit 140A-140D advantageously determines its own first random defrost cycle independently without any communication with centralized refrigeration system 110 or any of the other cooling units 140A-140D. Accordingly, integration and maintenance is greatly facilitated, as no modifications need to be made to the software of cooling system 100 to add, remove, or replace cooling units.

With reference to FIG. 1, at block 306, for each of cooling units 140A-140D, periodic defrost cycles are determined, wherein a start time of each of the periodic defrost cycles is selected periodically after the first defrost cycle from block 304.

Continuing with the example discussed above where the periodic defrost cycles occur every 20 minutes for a length of 5 minutes, assume that the first random defrost cycle starts at 15:00 for cooling unit 140A, at 22:00 for cooling unit 140B, at 17:00 for cooling unit 140C, and at 25:00 for cooling unit 140D. In this case, the periodic defrost cycles are as defined in Table 1 below (all times relative to power on time):

TABLE 1

EXAMPLE DEFROST CYCLES FOR COOLING UNITS 140A-140D

| | Cooling Unit 140A | Cooling Unit 140B | Cooling Unit 140C | Cooling Unit 140D |
|---|---|---|---|---|
| $1^{st}$ random defrost cycle | 15:00~20:00 | 22:00~27:00 | 17:00~22:00 | 25:00~30:00 |
| $2^{nd}$ periodic defrost cycle | 35:00~40:00 | 42:00~47:00 | 37:00~42:00 | 45:00~50:00 |
| $3^{rd}$ periodic defrost cycle | 55:00~60:00 | 62:00~67:00 | 57:00~62:00 | 65:00~70:00 |
| $4^{th}$ periodic defrost cycle | 75:00~80:00 | 82:00~87:00 | 77:00~82:00 | 85:00~90:00 |
| ... | ... | ... | ... | ... |

As shown in Table 1, assuming a relatively even distribution of start times from the random number generator used in block 304, the defrost cycles can occur in a largely desynchronized fashion, avoiding situations where many cooling units enter a defrost cycle at the same time. Accordingly, a baseline flow of coolant 120 can be established for cooling system 100, ensuring a stable heat load and avoiding shutdown and restart of centralized refrigeration system 110.

With reference to FIG. 1, at block 308, for each of cooling units 140A-140D, a flow of coolant 120 is denied through said each of cooling units 140A-140D during the first defrost cycle of block 304 and the periodic defrost cycles of block 306. With reference to FIG. 2, processor 150 may direct control valve 142 to bypass coolant 120 outside of a respective cooling unit when processor 150 determines that the respective cooling unit is in a defrost cycle.

Further, processor 150 may manage the flow of coolant 120 to maintain a food safe temperature for the respective cooling unit. Thus, a feedback loop may be established wherein control valve 142 and fan 146 are continuously adjusted until temperature sensor 148 registers an ambient temperature within the respective cooling unit that is safe for food storage.

It should be understood, of course, that the foregoing relates to exemplary embodiments of the invention and that modifications may be made without departing from the spirit and scope of the invention as set forth in the following claims.

We claim:

1. A method for providing load control for a plurality of cooling units, the method comprising:
   for each of the plurality of cooling units:
      allowing a flow of coolant through said each of the plurality of cooling units, wherein the flow of coolant is shared with the plurality of cooling units;
      determining a first defrost cycle, wherein a start time of the first defrost cycle is selected randomly within a predetermined time range;
      determining periodic defrost cycles, wherein a start time of each of the periodic defrost cycles is selected periodically after the first defrost cycle;
      denying the flow of coolant through said each of the plurality of cooling units during the first defrost cycle and the periodic defrost cycles;
      operating each of the plurality of cooling units without coordination with one another;
      enabling each of the plurality of cooling units to determine its own first random start defrost cycle independently of one another;

wherein the start times of the first random defrost cycles of each of the plurality of cooling units are evenly distributed within the predetermined time range.

2. The method of claim 1, wherein the predetermined time range is based on an interval defined by the periodic defrost cycles.

3. The method of claim 1, wherein the predetermined time range is based on a length defined by the periodic defrost cycles.

4. The method of claim 1, wherein the plurality of cooling units do not communicate with each other.

5. The method of claim 1, wherein the allowing of the flow of coolant starts substantially concurrently for each of the plurality of cooling units.

6. The method of claim 1, wherein the plurality of cooling units are within galleys of an aircraft, and wherein each of the plurality of cooling units manages the flow of coolant to maintain a food safe temperature.

7. The method of claim 1, wherein the coolant is provided using a centralized refrigeration system utilizing a vapor cycle system.

8. A load controlled cooling system comprising:
a plurality of cooling units;
an evaporator that is physically distinct and separate from the cooling units; and
a centralized refrigeration system providing a flow of vapor coolant to and from the evaporator;
a pump directly downstream, in terms of liquid coolant flow, of the plurality of coolant units and directly upstream, in terms of liquid coolant flow, of the evaporator;
wherein the centralized refrigeration system is physically distinct and separate from the cooling units and the evaporator;
wherein the centralized refrigeration system includes:
a compressor;
a condenser;
an expansion valve;
wherein each of the plurality of cooling units includes:
a control valve;
a heat exchanger directly downstream, in terms of liquid coolant flow, of the control valve, wherein the heat exchanger receives ambient air in the cooling unit;
a fan directly upstream, in terms of airflow, of the heat exchanger;
a temperature sensor that senses a temperature of the ambient air in the cooling unit;
a memory;
a processor in communication with the temperature sensor, the memory, the control valve and the fan, wherein the processor is configured to:
adjust the control valve;
adjust the fan;
allow the flow of liquid coolant through the cooling unit;
determine a first defrost cycle, wherein a start time of the first defrost cycles is selected randomly within a predetermined time range;
determine periodic defrost cycles, wherein a start time of each of the periodic defrost cycles is selected periodically after the first defrost cycle; and
deny the flow of coolant through the cooling unit during the first defrost cycle and the periodic defrost cycles;

enable the cooling unit to operate in the absence of coordination with other cooling units;
wherein each cooling unit determines its own first random start defrost cycle independently of the centralized refrigeration system and of the other cooling units;
wherein the start times of the first random defrost cycles of the plurality of cooling units are evenly distributed within the predetermined time range.

9. The load controlled cooling system of claim 8, wherein the predetermined time range is based on an interval defined by the periodic defrost cycles.

10. The load controlled cooling system of claim 8, wherein the predetermined time range is based on a length defined by the periodic defrost cycles.

11. The load controlled cooling system of claim 8, wherein the plurality of cooling units do not communicate with each other.

12. The load controlled cooling system of claim 8, wherein the allowing of the flow of coolant starts substantially concurrently for each of the plurality of cooling units.

13. The load controlled cooling system of claim 8, wherein the plurality of cooling units are within galleys of an aircraft, and wherein each of the plurality of cooling units manages the flow of coolant to maintain a food safe temperature.

14. The load controlled cooling system of claim 8, wherein the centralized refrigeration system utilizes a vapor cycle system.

15. A first cooling unit, of a plurality of cooling units, comprising a heat exchanger and a processor, wherein the processor is configured to: allow a flow of coolant through the heat exchanger; determine a first defrost cycle, wherein a start time of the first defrost cycle is selected randomly within a predetermined time range; determine periodic defrost cycles, wherein a start time of each of the periodic defrost cycles is selected periodically after the first defrost cycle; and deny the flow of coolant through the heat exchanger during the first defrost cycle and the periodic defrost cycles: operate each of the plurality of cooling units without coordination with one another; enable each of the plurality of cooling units to determine its own first random start defrost cycle independently of one another: wherein the start times of the first random defrost cycles of each of the plurality of cooling units are evenly distributed within the predetermined time range.

16. The first cooling unit of claim 15, wherein the predetermined time range is based on an interval and a length defined by the periodic defrost cycles.

17. The first cooling unit of claim 15, wherein the flow of coolant is provided by a centralized refrigeration system utilizing a vapor cycle system, and wherein the flow of coolant is shared with the plurality of cooling units that include the first cooling unit, and wherein each of the plurality of cooling units are configured to use the periodic defrost cycles.

18. The first cooling unit of claim 17, wherein the first cooling unit does not communicate with the plurality of cooling units.

19. The first cooling unit of claim 17, wherein the allowing of the flow of coolant through the heat exchanger is in response to a powering on of the first cooling unit, and wherein each of the plurality of cooling units is powered on substantially concurrently.

20. The first cooling unit of claim 15, wherein the first cooling unit is within a galley of an aircraft, and wherein the first cooling unit manages the flow of coolant to maintain a food safe temperature.

* * * * *